Nov. 23, 1937.    C. A. DISBROW    2,099,680
INSULATED RAIL JOINT
Filed Sept. 10, 1935    5 Sheets-Sheet 1
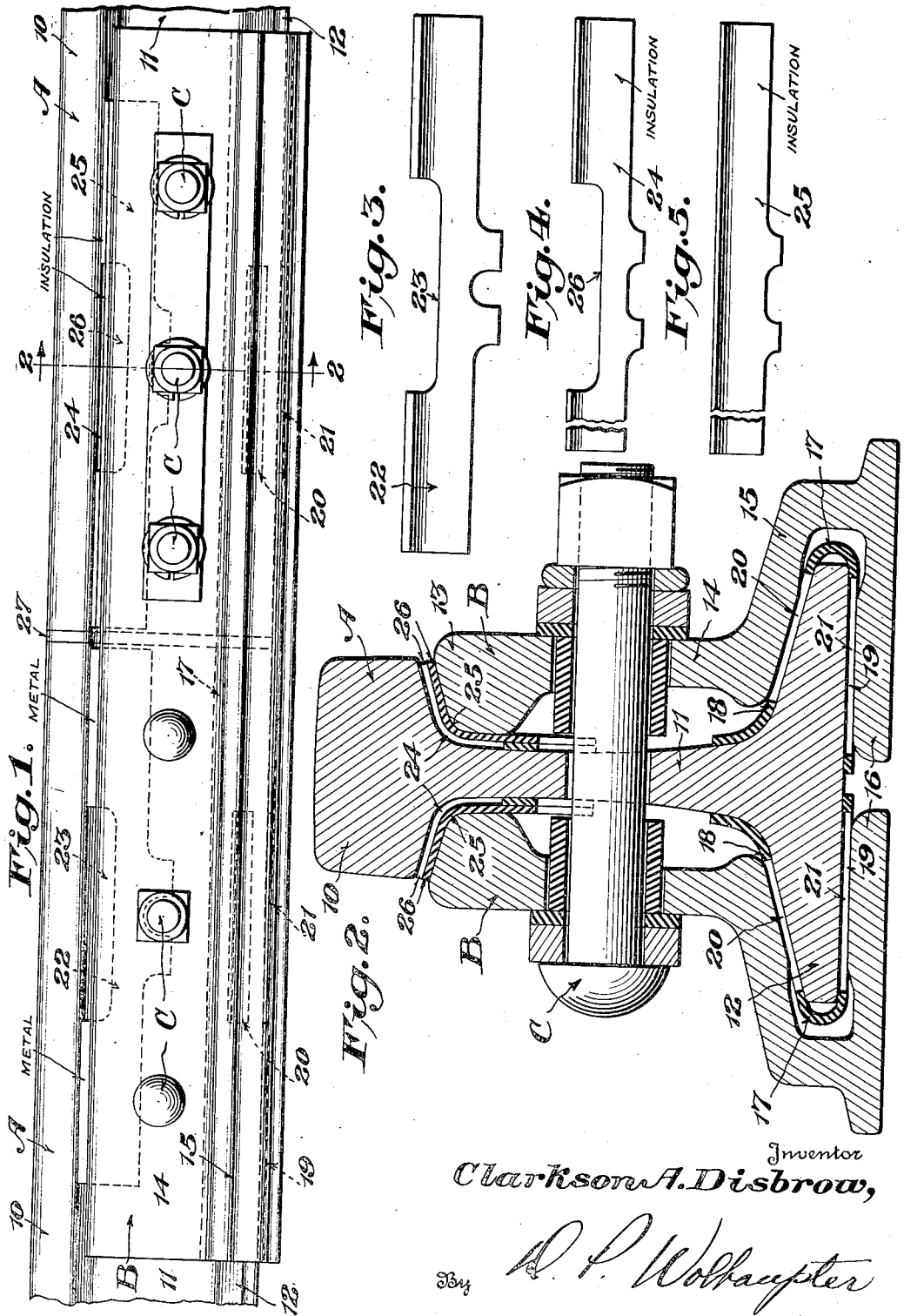
Inventor
Clarkson A. Disbrow,
By
Attorney

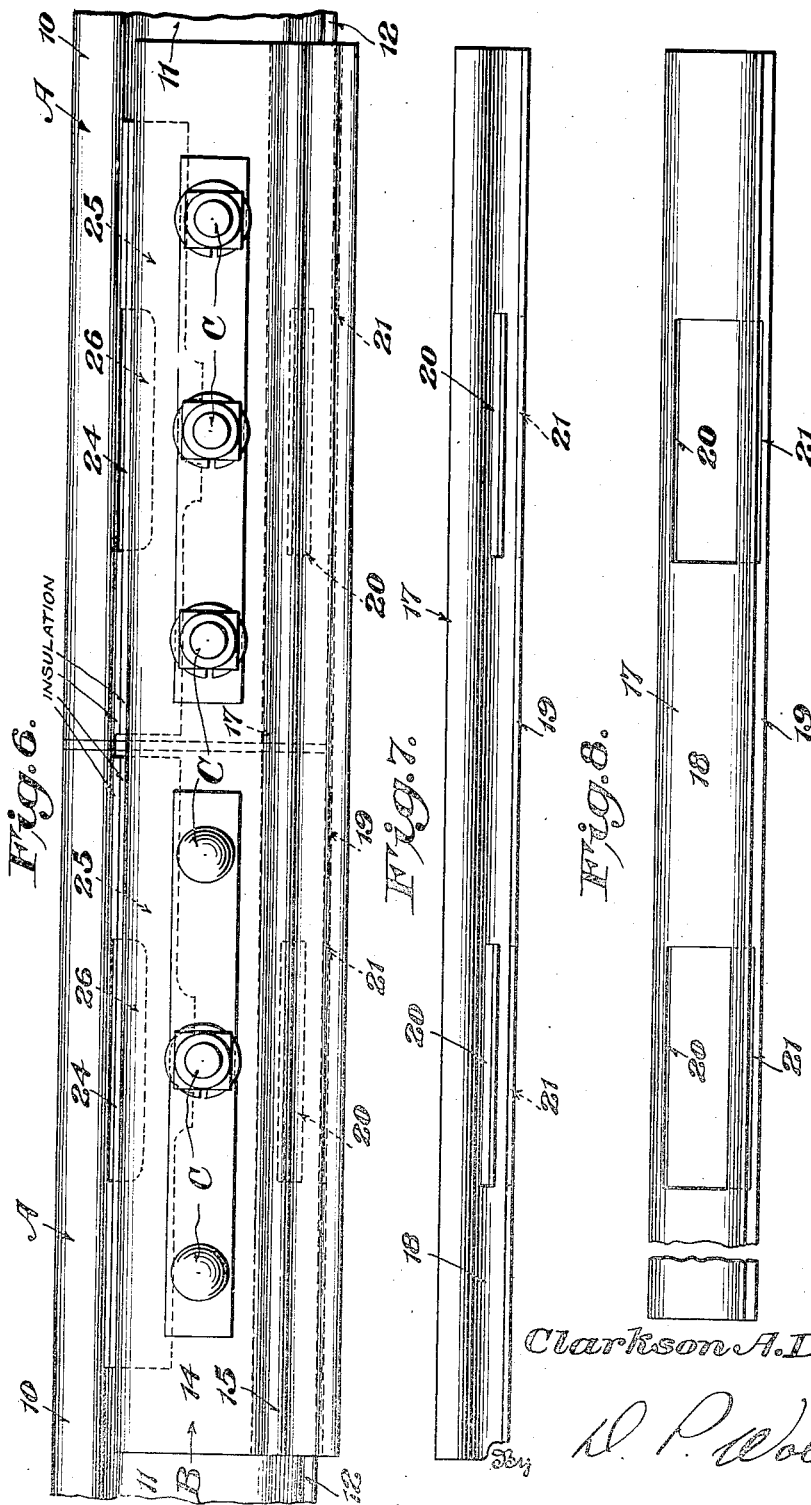

Nov. 23, 1937.  C. A. DISBROW  2,099,680
INSULATED RAIL JOINT
Filed Sept. 10, 1935  5 Sheets-Sheet 3
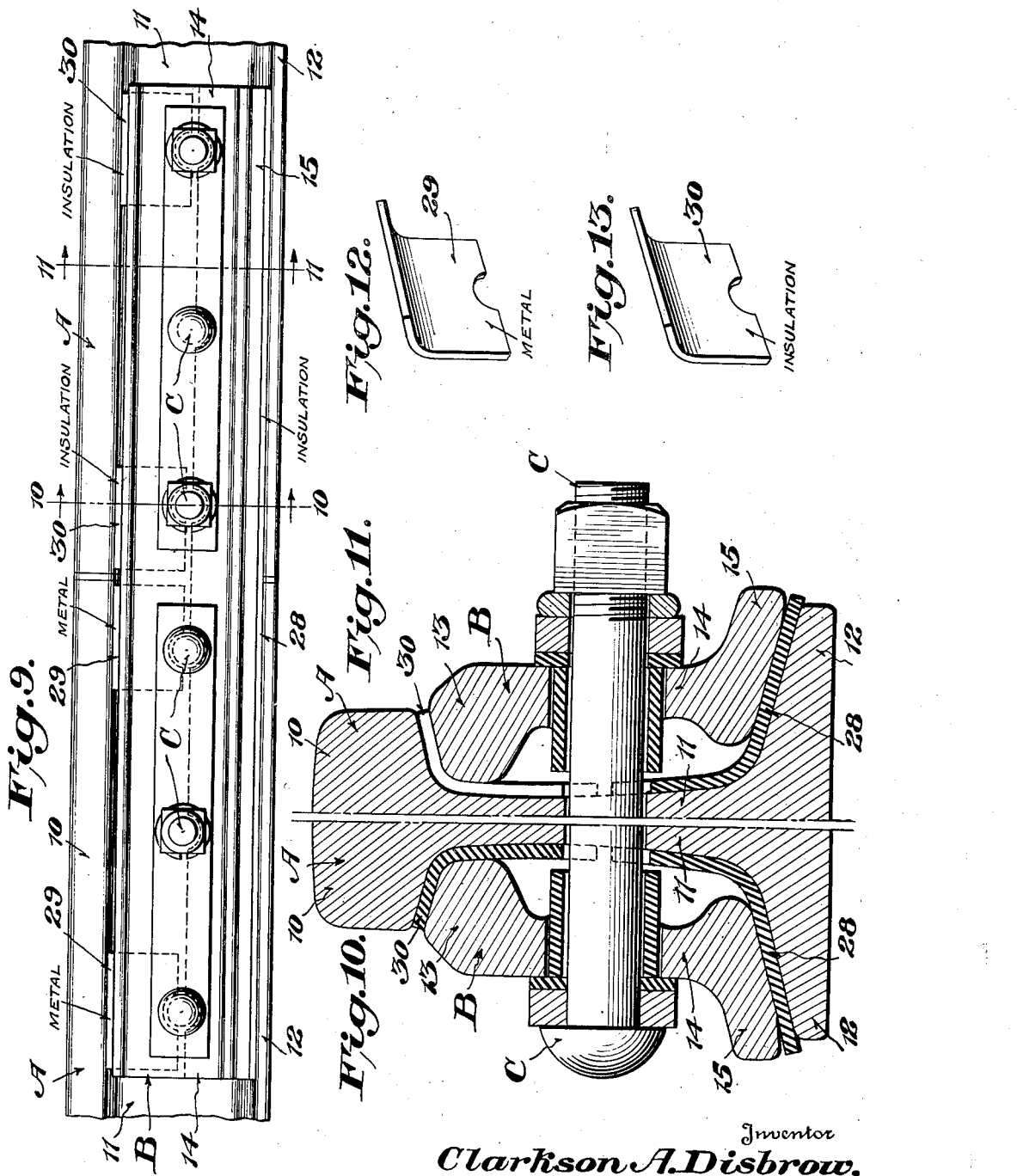
Inventor
Clarkson A. Disbrow,
By
Attorney Nov. 23, 1937.  C. A. DISBROW  2,099,680
INSULATED RAIL JOINT
Filed Sept. 10, 1935   5 Sheets-Sheet 4
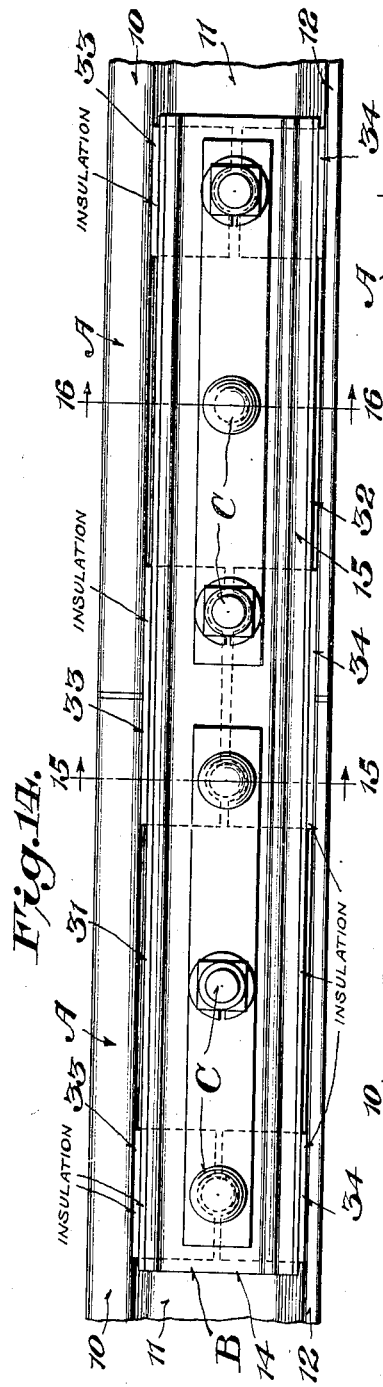
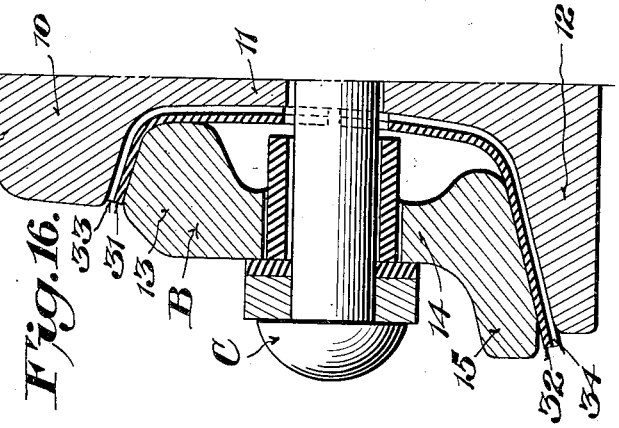
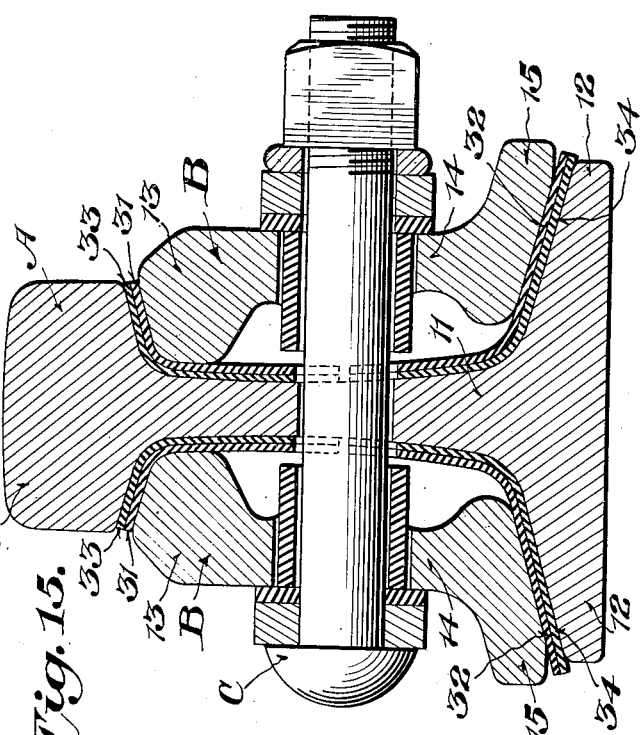
Inventor
Clarkson A. Disbrow,
By
Attorney Nov. 23, 1937.  C. A. DISBROW  2,099,680
INSULATED RAIL JOINT
Filed Sept. 10, 1935    5 Sheets-Sheet 5
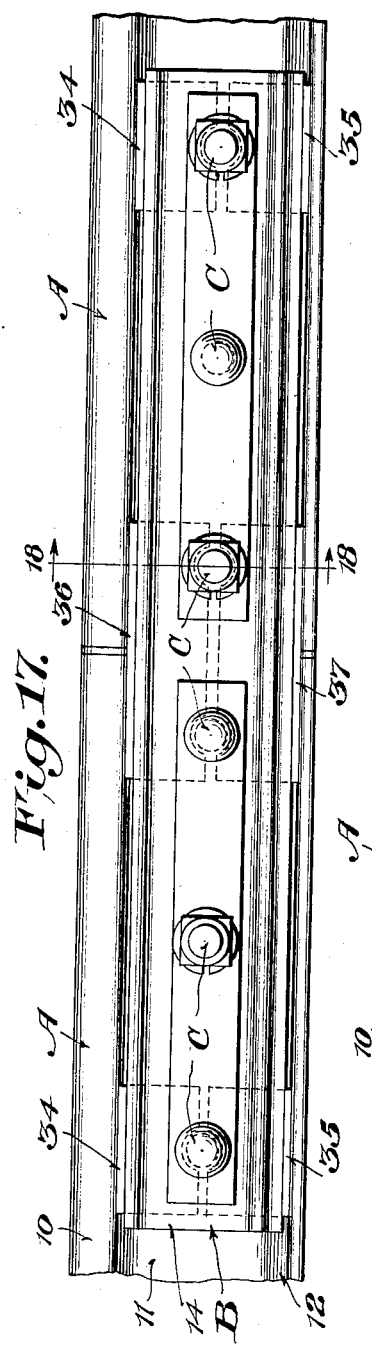
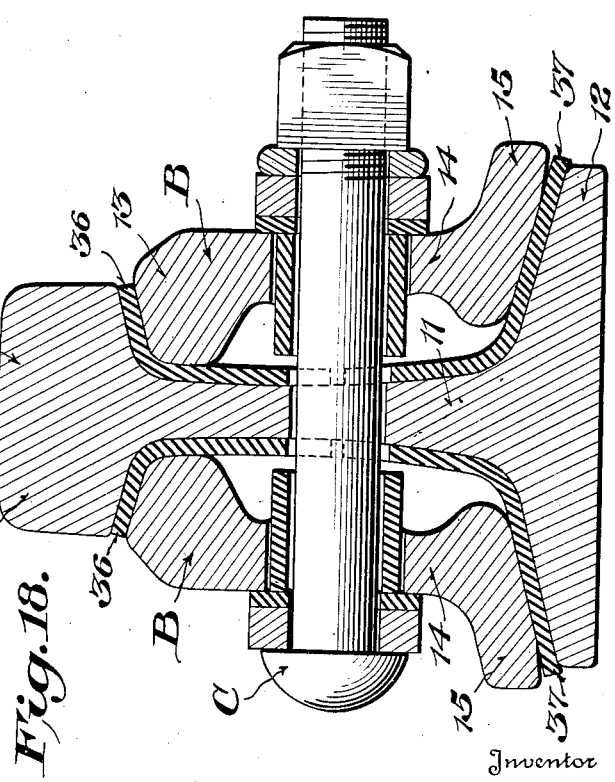
Inventor
Clarkson A. Disbrow, Patented Nov. 23, 1937

2,099,680

UNITED STATES PATENT OFFICE 2,099,680

INSULATED RAIL JOINT

Clarkson A. Disbrow, New Rochelle, N. Y., assignor, by mesne assignments, to Poor & Company, a corporation of Delaware Application September 10, 1935, Serial No. 39,975

7 Claims. (Cl. 238—155)

This invention relates to improvements in rail joints, particularly insulated rail joints, and has generally in view to provide a novel insulated joint wherein the rails are supported at intermittent or spaced points along the length of the joint, whereby an exceptionally tight fit between the component parts of the joint may be effected and maintained; whereby the wave motion of the rails may be permitted to pass substantially uninterruptedly through the joint, and whereby bending strains are distributed rather than localized at the middle of the joint as in the case of most present types of insulated joints, all to the end of reducing friction and wear on the joint parts and materially increasing the life thereof, particularly the insulating parts.

The invention also has in view to provide an insulated joint of the character mentioned in which renewals of the insulating parts thereof may be effected quickly, easily and economically.

With the foregoing and other purposes in view, which will become more fully apparent as the nature of the invention is better understood, the same consists in the novel features of construction, combinations and arrangements of parts as will be hereinafter more fully described, illustrated in the accompanying drawings and defined in the appended claims.

In the drawings, wherein like characters of reference denote corresponding parts in related views:—

Figure 1 is a side elevation of one practical embodiment of an insulated rail joint constructed in accordance with the invention.

Figure 2 is a transverse section on the line 2—2 of Fig. 1.

Figure 3 is an elevation of the metallic shim employed in the rail joint shown in Fig. 1.

Figures 4 and 5 are elevations of the head insulation elements employed in the rail joint shown in Fig. 1.

Figure 6 is a view similar to Fig. 1, illustrating an alternative embodiment of the invention.

Figure 7 is an inner side elevation of the base piece of insulation employed in the Figs. 1 and 6 embodiments of the invention.

Figure 8 is a plan view of the base piece of insulation shown in Fig. 7.

Figure 9 is a view similar to Figs. 1 and 6 illustrating another alternative embodiment of the invention.

Figures 10 and 11 are cross-sections on the lines 10—10 and 11—11, respectively, of Fig. 9.

Figures 12 and 13 are perspective views of one of the metallic shims and one of the head pieces of insulation, respectively, employed in the embodiment of the invention illustrated in Fig. 9.

Figure 14 is a view similar to Figs. 1, 6 and 9 illustrating another alternative embodiment of the invention.

Figures 15 and 16 are cross-sections on the lines 15—15 and 16—16, respectively, of Fig. 14.

Figure 17 is a view similar to Figs. 1, 6, 9 and 14 illustrating another alternative embodiment of the invention; and Figure 18 is a cross-section on the line 18—18 of Fig. 17.

According to each of the illustrated embodiments of the invention the meeting end portions of a pair of rails are designated as A, A, the splice bar is designated as B, and the joint bolts are designated as C. As usual, each rail includes a head 10, a web 11 and a base 12. Similarly, the splice bar in each instance includes, as usual, a head 13, a web 14 and a foot flange 15.

In any rail joint wherein the splice bar has loading cooperation throughout its length, or substantially throughout its length, with the rails, it is difficult to effect and to maintain a tight relationship between the bar and the rails. Moreover, the wave motion of the rails is not permitted to pass freely through the joint and bending strains are localized at the middle of the joint rather than being distributed along the length thereof. According to prior practice the splice bars of practically all insulated joints have loading cooperation substantially throughout their lengths with the rails. Consequently, the insulating material interposed between the splice bars and the rails is subjected, especially at its middle, to severe bending strains, which often result in its rupture, and to rapid abrasion and wear, necessitating frequent renewals thereof.

According to each of the embodiments of the present invention the insulation interposed between the splice bar and the rails affords loading cooperation of the splice bar with the rails at points spaced longitudinally along the bar, with clearance spaces between said loading points. The present joint therefore may be drawn tighter, and may be maintained tighter, than a joint of the full length loading type. At the same time, the wave motion of the rails is permitted to pass substantially uninterruptedly through the joint and bending strains are distributed along the length of the joint rather than being concentrated at the middle of the joint. As a result, bending strains, friction and wear on the parts of the joint, especially the insulating parts of the joint, are greatly reduced and the life of the insulating parts and of the joint considered as a whole, is materially increased.

Figures 1 to 5 of the drawings illustrate the invention as adapted to a "one end" insulated joint wherein the splice bar is of the well known, exceptionally stiff continuous type characterized by having a horizontally disposed base 16 extending inwardly from the foot flange 15 and underlying the rails. According to this embodiment of the invention, there is interposed between the splice bar and the rails the usual base or bottom piece of insulation, designated as 17, which extends from end to end of the joint and which may be formed either as a single piece of material or as a plurality of pieces. In any event, said base or bottom piece of insulation extends between the upper side of the rail flange and the foot flange of the splice bar, as indicated at 18, and between the base portion 16 of the splice bar and the bottoms of the rails, as indicated at 19, and preferably, but not necessarily, has its portions 18 and 19 recessed or cut away, as indicated at 20 and 21, respectively, at points between the middle and the ends of the joint, so that at the bottom of the joint the splice bar has loading cooperation with the rails medially and at the ends of the joint and clearance from the rails between said loading portions.

At the top of the joint, between the splice bar and one of the rails, is interposed a metallic shim 22 which is recessed or cut away between its ends, as indicated at 23, so that the splice bar has loading cooperation with said rail at the extreme end thereof; i. e. at the middle of the joint, and at the related end of the splice bar, and clearance from the rail between said loading portions. On the other hand, at the top of the joint between the splice bar and the other of the rails, there are interposed inner and outer sheets of insulation, designated as 24 and 25, respectively, which together provide at this end of the joint loading cooperation between the splice bar and the related rail to all intents and purposes duplicating the loading cooperation at the head of the joint between the first mentioned end of the splice bar and the first mentioned rail. In other words, one of the sheets 24, 25 of insulation, the inner sheet 24 in the present instance, is recessed or cut away between its ends, as indicated at 26, and the other sheet is continuous from the middle of the joint to the related end of the splice bar. Therefore, at this end of the joint the splice bar also has loading cooperation with the rail at the extreme end thereof; i. e. medially of the joint, and at the related end of the splice bar, and clearance from the rail between said loading portions. In this connection, instead of employing the two sheets 24, 25 of insulation, a single sheet duplicating the shim 22 might be employed, or two seperate short lengths of insulation might be employed, one at each end of the insulated end of the joint. In either of the latter cases, however, metallic particles might become lodged in the space between the rail and the splice bar, between the loading areas of the insulation, and thus produce a circuit between the rails through the splice bar; whereas, by having the two sheets of insulation, one extending continuously from end to end of the insulated end of the joint, any such forming of a circuit between the rails obviously is prevented.

As is understood, the thickness of the combined sheets 24, 25 of insulation is equal to the thickness of the shim 22. Consequently, when the joint bolts are tightened, the splice bar has loading cooperation medially with the extreme end portions of the rails and loading cooperation at its ends with the rails at points spaced from the rail ends, while between said loading points are clearance or non-loading areas. It is possible, therefore, to produce and maintain an exceptionally tight fit between the parts of the joint. At the same time, the wave motion of the rails is permitted to pass substantially uninterruptedly through the joint and bending strains are distributed along the length of the joint rather than being concentrated at the middle thereof, as is the case in joints wherein the splice bar has continuous loading cooperation throughout its length, or substantially throughout its length, with the rails. Such being the case, friction, wear, and bending or rupturing strains on the joint parts and especially on the insulating parts, are greatly reduced and the life of the joint considered as a whole and especially the insulation, is materially increased. Moreover, whenever renewal of any or all of the insulation becomes necessary, it is obvious that the renewal may be quickly and easily effected. Also, it is obvious that renewals may be economically effected due to the inexpensive design of the insulation.

The insulation of the joint is completed by interposing an end post 27 of insulation between the rail ends and by insulating the joint bolts in any known or desired manner.

The invention is not restricted to joints of the "one end" insulated type. On the contrary, it is evident that the insulated end of the joint shown in Fig. 1 may be duplicated at the other end of the joint, thereby to provide a joint which is insulated at both ends thereof. This is illustrated in Fig. 6 of the drawings.

Splice bars of the continuous type are inherently very rigid and produce exceptionally rigid joints. For this reason it is preferred to recess the bottom insulation as heretofore described in order better to permit the wave motion of the rails to pass through the joint and to provide at the base of the joint the desirable intermittent or spaced loading cooperation of the splice bar with the rails the same as at the top of the joint. As previously stated, however, it is not essential that there be intermittent loading cooperation between the splice bar and the rails at the base of the joint.

According to Fig. 6, the "one end" insulation of Fig. 1 is duplicated at the two ends of the joint. Obviously, however, instead of the duplicate sets of insulation, the two sets of insulation may be combined to extend continously from end to end of the joint. Moreover, separate, short length pieces of insulation obviously may be employed with the insulating sheet 25 for example, in lieu of pieces such as the pieces 24, to provide the desired intermittent loading cooperation between the splice bar and the rails.

According to the Figs. 9 to 13 embodiment of the invention the splice bar, instead of being of the continuous type, is devoid of any base portion underlying the rails. The joint is, therefore, inherently more flexible than the joint illustrated in Fig. 1 and does not require that the base piece of insulation 28 interposed between the base of the splice bar and the upper faces of the rail flanges, and extending preferably the full length of the joint, shall be recessed. Said base piece of insulation may, however, be recessed similarly to the base piece of insulation 17 of the Fig. 1 form of the invention if so desired. The joint is of the "one end" insulated type and the intermittent loading cooperation between the splice bar and the rails at the head of the joint is afforded by a pair of metallic shims 29, 29 at one end of the joint and a pair of insulating shims 30, 30 at the other end of the joint, one of each pair of said shims being located at the related end of the bar and the other being located medially of the joint between the bar and the extreme end portion of the related rail. This joint obviously provides for exceptionally free passage of the wave motion of the rails therethrough.

Figs. 14 to 16 also illustrate a joint in which the splice bar, instead of being of the stiff, continuous type, is of the more flexible type devoid of any base portion underlying the rails, and in which the joint is insulated at both ends as in the case of the joint illustrated in Fig. 6. Head and base pieces of insulation 31 and 32, respectively, extend the full length of the joint, while cooperating with said head and base pieces of insulation, either between the same and the rails or between the same and the splice bar, are short length head and base pieces of insulation 33 and 34, respectively. One short length head piece and one short length base piece of insulation are disposed at each end of the joint, while medially of the joint a single short length head piece and a single short length base piece of insulation span the rail ends. In this joint the splice bar therefore has intermittent loading cooperation with the rails at both the head and the base of the joint and, as in the case of the Fig. 6 embodiment of the invention, a circuit between the rails can not be formed by metallic particles lodging in the clearance spaces between the splice bar and the rails.

Figs. 17 and 18 illustrate what may be termed a compromise between the joints illustrated in Figs. 9 and 14. That is to say, the joint is insulated at both ends, as in Fig. 14, but by means of single thicknesses of insulation, as in Fig. 9, instead of by double thicknesses of insulation, as in Fig. 14. In other words, at each end of the joint, between the splice bar and the related rail, is a short length head piece of insulation 34 and a short length base piece of insulation 35, while at the middle of the joint, between the splice bar and the rails, is a short length head piece of insulation 36 and a short length base piece of insulation 37, both of which span the rail ends. Obviously, this insulated joint is of utmost simplicity providing for intermittent loading cooperation between the splice bar and the rails and for free passage of the wave motion of the rails through the joint, with all the attendant advantages.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. A rail joint comprising the rails, the splice bar, and a pair of superimposed sheets of insulation between the splice bar and the rails, one of said sheets extending at least from the middle of the joint to one end thereof and between the middle and said end of the joint being recessed, and the other sheet extending at least from the middle of the joint to said end thereof and across the recessed portion of the first mentioned sheet.

2. In a rail joint, the rails, the splice bar, having a foot flange, and a base piece of insulation interposed between the foot flange of the splice bar and the flange of at least one of the rails, said base piece of insulation having a recess surrounded by the insulation and providing a substantial non-loading area between the splice bar and the rail flange intermediate the rail end and the end of the splice bar.

3. In a rail joint of the continuous type, the rails, the splice bar having a foot flange overlying the rail flanges and a base underlying the rails, a base piece of insulation having a portion thereof interposed between the foot flange of the splice bar and the flange of at least one of the rails and having another portion thereof interposed between the base of the splice bar and the bottom of the same rail, each of said portions of said insulation having a recess surrounded by the insulation and providing a substantial non-loading area between the splice bar and the rail flange intermediate the rail end and the end of the splice bar.

4. In a rail joint of the continuous type, the rails, the splice bar having a base underlying the rail flanges, and a base piece of insulation interposed between the base of the splice bar and the under side of at least one of the rails, said base piece of insulation having a recess surrounded by the insulation and providing a substantial non-loading area between the base of the splice bar and the underside of the rail, intermediate the rail end and the end of the splice bar.

5. In a rail joint, the rails, the splice bar having a foot flange overlying the rail flanges, head insulation at the middle and the ends of the joint, the joint having head non-loading areas between the middle and the ends thereof, and a base piece of insulation between the foot flange of the splice bar and the rail flanges, said base piece of insulation having a pair of recesses, one intermediate the middle of the joint, and one end thereof and the other intermediate the middle of the joint and the other end thereof, each surrounded by the insulation and providing a substantial non-loading area between the foot flange of the splice bar and the flange of the related rail.

6. A rail joint as set forth in claim 5 in which the splice bar has a base underlying the bottoms of the rails, in which the base piece of insulation has a portion interposed between the base of the splice bar and the under sides of the rails, and in which said portion of the insulation has a pair of recesses, one intermediate the middle of the joint and one end thereof and the other intermediate the middle of the joint and the other end thereof, each providing a substantial non-loading area between the base of the splice bar and the under side of the related rail.

7. In a rail joint, the rails, the splice bar, and a pair of superimposed sheets of insulation between the head of the splice bar and the head of at least one of the rails, one of said sheets extending from the middle of the joint to one end thereof and having a recess intermediate its ends providing a non-loading area between the head of the splice bar and the head of the rail, said piece of insulation having a formation for engagement with a joint bolt to hold said piece of insulation against endwise movement, the other sheet being coextensive in length with the first sheet and bridging the recess in the latter and also having a formation for engagement with a joint bolt to hold said second mentioned sheet against endwise movement.

CLARKSON A. DISBROW.